United States Patent
Kobayashi et al.

[11] Patent Number: 6,121,590
[45] Date of Patent: Sep. 19, 2000

[54] CERAMIC-METAL JUNCTION STRUCTURE AND A METHOD FOR MANUFACTURING THE SAME

[75] Inventors: Masayuki Kobayashi; Makoto Shirai, both of Kuwana; Yoshitsugu Sakamoto, Kariya, all of Japan

[73] Assignee: DENSO Corporation, Kariya, Japan

[21] Appl. No.: 09/396,795

[22] Filed: Sep. 15, 1999

[30] Foreign Application Priority Data

Jan. 16, 1998 [JP] Japan .................................. 10-20274

[51] Int. Cl.⁷ .................................................. H05B 3/10
[52] U.S. Cl. ........................................... 219/553; 204/429
[58] Field of Search .................................. 219/209, 210, 219/262, 267, 270, 469, 523, 534, 535, 541, 544, 546, 553, 85.22; 204/424, 425, 426, 427, 428, 429

[56] References Cited

U.S. PATENT DOCUMENTS

| | | | |
|---|---|---|---|
| 4,512,871 | 4/1985 | Kato et al. | 204/429 |
| 4,652,727 | 3/1987 | Hoshizaki et al. | 219/541 |
| 4,668,375 | 5/1987 | Kato et al. | 204/426 |
| 4,804,823 | 2/1989 | Okuda et al. | 219/553 |
| 4,834,863 | 5/1989 | Yamada et al. | 204/429 |
| 4,877,936 | 10/1989 | Kobayashi | 219/85.22 |
| 4,952,903 | 8/1990 | Shibata et al. | 219/553 |
| 4,961,835 | 10/1990 | Kobayashi et al. | 204/427 |
| 5,146,313 | 9/1992 | Kato et al. | 219/553 |
| 5,318,756 | 6/1994 | Sheller et al. | 219/541 |
| 5,665,262 | 9/1997 | Hajaligol et al. | 219/553 |
| 5,705,261 | 1/1998 | Axelson | 219/553 |
| 5,705,272 | 1/1998 | Taniguchi | 219/553 |
| 5,804,092 | 9/1998 | Axelson et al. | 219/270 |
| 5,948,225 | 9/1999 | Katafuchi et al. | 204/429 |
| 5,990,463 | 11/1999 | Shirai et al. | 219/544 |
| 5,998,765 | 12/1999 | Mizuno et al. | 219/553 |

*Primary Examiner*—Teresa Walberg
*Assistant Examiner*—Fadi H. Dahbour
*Attorney, Agent, or Firm*—Pillsbury Madison & Sutro LLP

[57] ABSTRACT

A metallic layer is provided on the surface of a ceramic body. A junction layer is provided on the metallic layer. The junction layer contains 40~98 wt % Cu and 2~20 wt % Ni. A conductive member is bonded to the metallic layer via the junction layer.

11 Claims, 4 Drawing Sheets

CERAMIC-METAL JUNCTION STRUCTURE AND A METHOD FOR MANUFACTURING THE SAME

BACKGROUND OF THE INVENTION

The present invention relates to a ceramic-metal junction structure preferably applicable to a ceramic heater or the like.

Metallic layers, containing tungsten (W) as a main component, are conformable with alumina and have excellent heat durability or resistivity. This kind of metallic layers thus can be preferably used for forming signal output terminals or power feeding terminals of electric elements accommodated in a ceramic body. In this case, a conductive member, such as an electric wire, is bonded to the signal output terminal or the power feeding terminal by brazing or the like.

The conductive member may be bonded to the W-containing metallic layer provided on a ceramic body. According to a conventional method, a Ni(nickel)-plating film is formed on the surface of this metallic layer and the conductive member is brazed to the Ni-plating film by using a Cu(copper)-Au(gold) wax material.

According to this conventional method, providing the Ni-plating film on the metallic layer in advance is inevitable in view of the fact that the Cu-containing wax material cannot be directly bonded to the W-containing metallic layer due to poor wettability.

The above-described conventional method is disadvantageous in the high manufacturing cost by the usage of the Cu—Au wax which is expensive.

To reduce the cost, it may be possible to reduce the Au content in the Cu—Au wax. However, reducing the Au content will result in deterioration of the bonding strength. This is believed that the brazing temperature needs to be increased in accordance with the increase of the Cu component. The W—Ni intermetallic compound, produced between the Ni-plating film and the W- containing metallic layer when the brazing temperature is increased, reduces the bonding strength between the Ni-plating film and the conductive member.

SUMMARY OF THE INVENTION

An object of the present invention is to provide a ceramic-metal junction structure capable of providing a satisfactory strength in the bonding between the metallic layer and the conductive member and also capable of reducing the manufacturing cost. Furthermore, the present invention provides a method for manufacturing the ceramic-metal junction structure.

In order to accomplish this and other related objects, a first aspect of the present invention provides a ceramic-metal junction structure comprising a ceramic body, a metallic layer provided on the surface of the ceramic body and containing 70~100 wt % tungsten (W), a junction layer provided on the metallic layer and containing copper (Cu) as a main component, and a conductive member bonded to the metallic layer via the junction layer, wherein the junction layer contains 40~98 wt % Cu and 2~20 wt % nickel (Ni).

When the Cu content in the junction layer is 0~40 wt %, the total amount of Cu is relatively small. The hardness of the junction layer becomes large due to the influence of a third component other than Cu and Ni. This will induce the crack.

On the other hand, when the Cu content in the junction layer is 98~100 wt %, the total amount of Ni is relatively small. Accordingly, the junction layer has poor wettability for the metallic layer. This will reduce the bonding strength, weakening the bonding condition between the junction layer and the metallic layer.

When the Ni content in the junction layer is 0~2 wt %, the junction layer has poor wettability for the metallic layer. This will reduce the bonding strength, weakening the bonding condition between the junction Fayer and the metallic layer. When the Ni content in the junction layer is 20~100 wt %, the W—Ni intermetallic compound will be produced during the manufacturing process. This will reduce the bonding strength.

The metallic layer, when including 70~100 wt % W, is conformable with the alumina-containing ceramic body and has excellent heat durability or resistivity. If the W content in the metallic layer is 0~70 wt %, the metallic layer will have poor bonding strength for the ceramic body as well as poor heat durability or resistivity.

The metallic layer may contain W only.

The ceramic body may comprise alumina, silica, calcia, or magnesia. It is preferable that the conductive member comprises Ni. As described later, when the conductive member is bonded to the junction layer, Ni diffuses from the conductive member into the junction layer. Thus, the junction layer can possess increased wettability for the metallic layer. The bonding condition between the junction layer and the metallic layer is enhanced.

The ceramic-metal junction structure of the present invention can be applied to the ceramic heater as described later. Furthermore, the ceramic-metal junction structure of the present invention is applicable to a signal output terminal or a power feeding terminal of a semiconductor device or a sensor.

Next, the function of the present invention will be explained.

The ceramic-metal junction structure in accordance with one aspect of the present invention comprises the ceramic body, the metallic layer provided on the surface of the ceramic body, the junction layer provided on the metallic layer and containing Cu and Ni in the specific ratio, and the conductive member bonded to the metallic layer via the junction layer.

As the junction layer includes Ni, the junction layer has excellent wettability for the W-containing metallic layer. Thus, the junction layer provides a sufficient strength in the bonding between the conductive member and the metallic layer.

Furthermore, there is no necessity of providing the Ni-plating film which was required for the conventional ceramic-metal junction structure. The manufacturing cost can be reduced by omitting the Ni-plating film.

As described above, the present invention provides the ceramic-metal junction structure capable of assuring a sufficient strength in the bonding between the metallic layer and the conductive member and also capable of reducing the manufacturing cost.

Furthermore, it is preferable that the junction layer contains 0~58 wt % Au. This is effective to eliminate the W—Ni intermatellic compound. The bonding strength is increased. And, the manufacturing is reduced.

When the Au content in the junction layer is 58~85 wt %, the hardness of the junction layer becomes so large that cracks will be produced. When the Au content in the junction layer is 85~100 wt%, the manufacturing cost will be very high. The cost decreases in accordance with reduction of the Au amount. Thus, it is preferable to reduce the amount of Au as much as possible.

Furthermore, another aspect of the present invention provides a ceramic-metal junction structure comprising a ceramic body, a metallic layer provided on a surface of the ceramic body and containing 70~100 wt % W, a Ni-plating film provided on the metallic layer, a junction layer provided on the Ni-plating film and containing Cu as a main component, and a conductive member bonded to the metallic layer via the Ni-plating film and the junction layer, wherein the junction layer contains 65~98 wt % Cu and 2~20 wt % Ni.

It is preferable that the Ni-plating layer has a thickness equal to or smaller than 1 μm.

When the thickness of the Ni-plating film exceeds 1 μm, the W—Ni intermetallic compound will be produced during the manufacturing process. This will reduce the bonding strength.

Furthermore, it is preferable to reduce the thickness of the Ni-plating film as much as possible.

When the Cu content in the junction layer is 0~65 wt %, it is well known that the bonding is realized preferably regardless of the thickness of the Ni-plating film. Thus, the junction layer containing 0~65 wt % Cu is excluded.

When the Cu content in the junction layer is 98~100 wt %, the ratio of Ni contained in the junction layer is small. Accordingly, the junction layer has poor wettability for the metallic layer. This will reduce the bonding strength, weakening the bonding condition between the junction layer and the metallic layer.

When the Ni content in the junction layer is 0~2 wt %, the junction layer has poor wettability for the metallic layer. This will reduce the bonding strength, weakening the bonding condition between the junction layer and the metallic layer. When the Ni content in the junction layer is 20~100 wt %, the W—Ni intermetallic compound will be produced during the manufacturing process. This will reduce the bonding strength.

The ceramic-metal junction structure in accordance with another aspect of the present invention comprises the ceramic body, the metallic layer provided on the surface of the ceramic body, the Ni-plating film having a specific thickness, the junction layer provided on the Ni-plating film and containing Cu and Ni in the specific ratio, and the conductive member bonded to the metallic layer via the junction layer.

As the junction layer contains Ni in addition to the provision of the Ni-plating film, the junction layer has excellent wettability for the W-containing metallic layer. Thus, the junction layer provides a sufficient strength in the bonding between the conductive member and the metallic layer.

As the Ni-plating film is sufficiently thin, it becomes possible to suppress the generation of the W—Ni intermetallic compound, maintaining the bonding strength.

Furthermore, the capability of suppressing the generation of the W—Ni intermetallic compound is preferable in that the amount of Au added to the junction layer can be reduced. The manufacturing cost can be reduced.

As described above, the present invention provides the ceramic-metal junction structure capable of assuring a sufficient strength in the bonding between the metallic layer and the conductive member and also capable of reducing the manufacturing cost.

Furthermore, it is preferable that the junction layer contains 0~33 wt % Au. This is effective to eliminate the generation of the W—Ni intermetallic compound. The bonding strength is increased. And, the manufacturing cost can be reduced.

When the Au content in the junction layer is 33~100 wt %, it is well known that the bonding is realized preferably regardless of the thickness of the Ni-plating film. Thus, the junction layer containing 33~100 wt % Au is excluded. The cost decreases in accordance with reduction of the Au amount. Thus, it is preferable to reduce the amount of Au as much as possible.

Furthermore, it is preferable that an affected nickel layer is formed between the metallic layer and the junction layer and the nickel content in the affected nickel layer is larger than that in the junction layer. Preferably, the conductive member contains 90~100 wt % nickel.

Furthermore, it is preferable that the junction layer contains at least one substance selected from the group consisting of P, Cd, Pd, Zn, and Fe, and the total amount of the selected substance or substances is equal to or smaller than 10 wt %. This is effective to ensure the functions and effects obtained by the above-described arrangements of the present invention.

When the total amount of the selected substance or substances exceeds 10 wt %, a significant amount of intermetallic compound is produced between the selected substance or substances and Ni, Cu, or Au. The produced intermetallic compound may deteriorate the bonding strength. These substances may act as impurity, when contained in the junction layer. Thus, it is preferable to reduce the amount of these substances as much as possible.

Furthermore, it is preferable that the ceramic-metal junction structure is employed in a ceramic heater. By applying the present invention to the ceramic heater, it becomes possible to obtain a reliable and excellent ceramic heater.

Furthermore, another aspect of the present invention provides a method for manufacturing a ceramic-metal junction structure comprising the steps of forming a metallic layer containing 70~100 wt % W on a surface of a ceramic body, and bonding a conductive member containing Ni to the metallic layer by using a junction layer containing 40~100 wt % Cu.

When the Cu content in the junction layer is 0~40 wt %, the hardness of the junction layer becomes large and the total amount of Cu is relatively small. The amount of Ni diffusing from the conductive member is small. The ratio of Ni contained in the junction layer is small. Accordingly, the conductive member has poor wettability for the junction layer, This will reduce the bonding strength, weakening the bonding condition between the conductive member and the junction layer. This phenomenon becomes remarkable when the conductive member include a small amount of Ni.

In this aspect of the present invention, the junction layer contains Cu as a main component. When the conductive member is bonded by the junction layer, Ni diffuses from the conductive member into the junction layer. The junction layer, containing a sufficient amount of Ni, possesses the excellent wettability for the W-containing metallic layer. Thus, the junction layer provides a sufficient strength in the bonding between the conductive member and the metallic layer.

Furthermore, there is no necessity of providing the Ni-plating film which was required for the conventional ceramic-metal junction structure. The manufacturing cost can be reduced by omitting the Ni-plating film.

As described above, another aspect of the present invention provides the manufacturing method for the ceramic-metal junction structure capable of assuring a sufficient strength in the bonding between the metallic layer and the conductive member and also capable of reducing the manufacturing cost.

Furthermore, it is preferable that the conductive member contains 25~100 wt % Ni. This is effective to ensure the effects of the present invention.

If the Ni content in the conductive member is 0~25 wt %, the diffusion of Ni into the junction layer will be insufficient. Thus, the bonding strength is reduced and the bonding condition is worsened.

The conductive member may contain 100 wt % Ni or may be a Ni-containing alloy, such as coval or 42 alloy.

Furthermore, another aspect of the present invention provides a method for manufacturing a ceramic-metal junction structure comprising the steps of forming a metallic layer containing 70~100 wt % W on a surface of a ceramic body, and bonding a conductive member to the metallic layer by using a junction layer containing 40~98 wt % Cu and a certain amount of Ni.

When the Cu content in the junction layer is 0~40 wt %, the total amount of Cu is relatively small. The hardness of the junction layer becomes large due to the influence of a third component other than Cu and Ni. This will induce the crack.

On the other hand, when the Cu content in the junction layer is 98~100 wt %, the total amount of Ni is relatively small. Accordingly, the junction layer has poor wettability for the metallic layer. This will reduce the bonding strength, weakening the bonding condition between the junction layer and the metallic layer.

Next, the function of the present invention will be explained.

According to the manufacturing method of the present invention, the junction layer contains Ni which provide excellent wettability in the bonding between the junction layer and the W-containing metallic layer. Thus, the junction layer provides a sufficient strength in the bonding between the conductive member and the metallic layer.

Furthermore, there is no necessity of providing the Ni-plating film which was required for the conventional ceramic-metal junction structure. The manufacturing cost can be reduced by the omitting the Ni-plating film.

As described above, the present invention provides the manufacturing method for the ceramic-metal junction structure capable of assuring a sufficient strength in the bonding between the metallic layer and the conductive member and also capable of reducing the manufacturing cost.

Furthermore, it is preferable that the conductive member contains 2~20 wt % Ni. This is effective to ensure the effects of the present invention.

If the Ni content in the junction layer is 0~2 wt %, the junction layer will have poor wettability for the metallic layer. This will reduce the bonding strength, weakening the bonding condition between the junction layer and the metallic layer. On the other hand, when the Ni content in the junction layer is 20~100 wt %, the W—Ni intermetallic compound will be produced during the manufacturing process. This will reduce the bonding strength.

Furthermore, another aspect of the present invention provides a method for manufacturing a ceramic-metal junction structure comprising the steps of forming a metallic layer containing 70~100 wt % W on a surface of a ceramic body, forming a Ni-plating film having a thickness equal to or smaller than 10 $\mu$m on the metallic layer, and bonding a conductive member on a surface of the Ni-plating film by using a junction layer containing Cu.

If the thickness of the Ni-plating film exceeds 10 um, the W—Ni intermetallic compound will be produced during the manufacturing process.

This will reduce the bonding strength. It is preferable to reduce the thickness of the Ni-plating film as much as possible.

As the junction layer contains Ni in addition to the provision of the Ni-plating film, the junction layer has excellent wettability for the W-containing metallic layer. Thus, the junction layer provides a sufficient strength in the bonding between the conductive member and the metallic layer.

As the Ni-plating film is sufficiently thin, it becomes-possible to suppress the generation of the W—Ni intermetallic compound, maintaining the bonding strength.

Furthermore, the capability of suppressing the generation of the W—Ni intermetallic compound is preferable in that the amount of Au added to the junction layer can be reduced. The manufacturing cost can be reduced.

As described above, the present invention provides the manufacturing method for the ceramic-metal junction structure capable of assuring a sufficient strength in the bonding between the metallic layer and the conductive member and also capable of reducing the manufacturing cost.

Furthermore, it is preferable that the junction layer contains 65~100 wt % Cu. This is effective to ensure the effect of the present invention.

When the Cu content in the junction layer is 0~65 wt %, it is well known that the bonding is realized preferably regardless of the thickness of the Ni-plating film. Thus, the junction layer containing 0~65 wt % Cu is excluded.

It is preferable that the conductive member contains nickel. The nickel content in the conductive member is not smaller than 90 wt %. The thickness of the Ni-plating film is not larger than 5 $\mu$m before the conductive member is bonded on the Ni-plating film by brazing.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
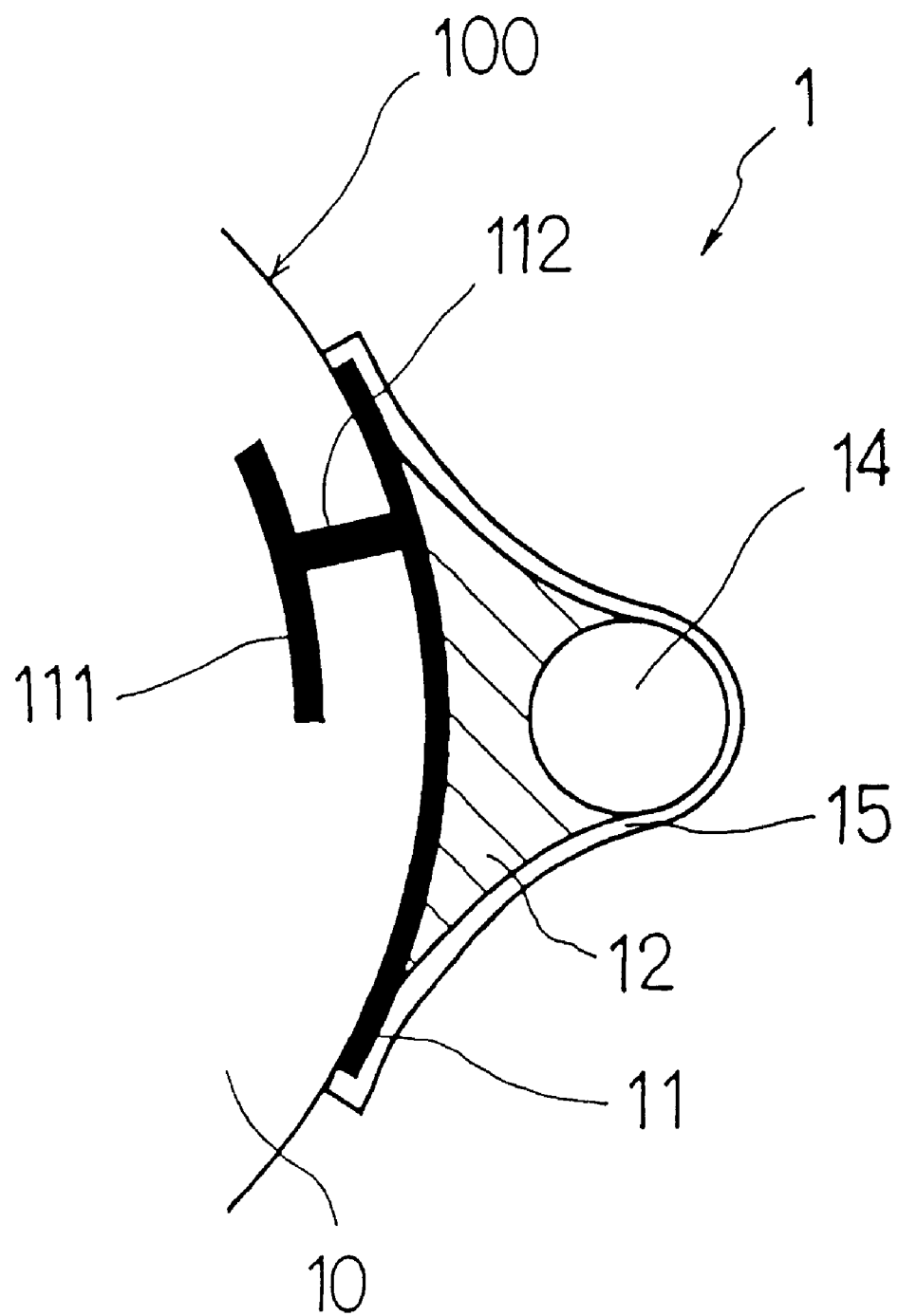
FIG. 1 is a cross-sectional view showing an essential arrangement of a ceramic-metal junction structure in accordance with a first embodiment of the present invention, taken along a line A—A shown in FIG. 2.

Preferred embodiments of the present invention will be explained hereinafter with reference to attached drawings. Identical parts are denoted by the same reference numerals throughout the views.

First Embodiment

A ceramic-metal junction structure in accordance with a first embodiment of the present invention will be explained with reference to FIGS. 1 to 3.

As shown in FIG. 1, a ceramic-metal junction structure 1 in accordance with the first embodiment comprises a ceramic body 10, and a metallic layer 11 provided on a surface 100 of the ceramic body 10. The metallic layer 11 contains 70~100 wt % W. A junction layer 12 is provided on the metallic layer 11. The junction layer 12 contains Cu as a main component. And, a conductive member 14 is bonded to the metallic layer 11 via the junction layer 12.

The junction layer 12 contains 92 wt % Cu and 8 wt % Ni. The conductive member 14 is made of Ni.

Hereinafter, details of the first embodiment will be explained.

Figure 2:
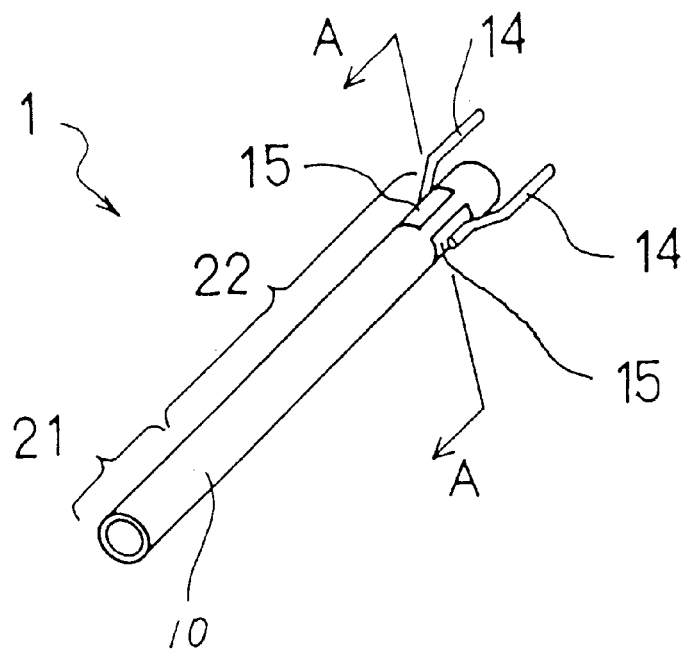
FIG. 2 is a perspective view showing a ceramic heater employing the ceramic-metal junction structure in accordance with the first embodiment of the present invention.
Figure 3:
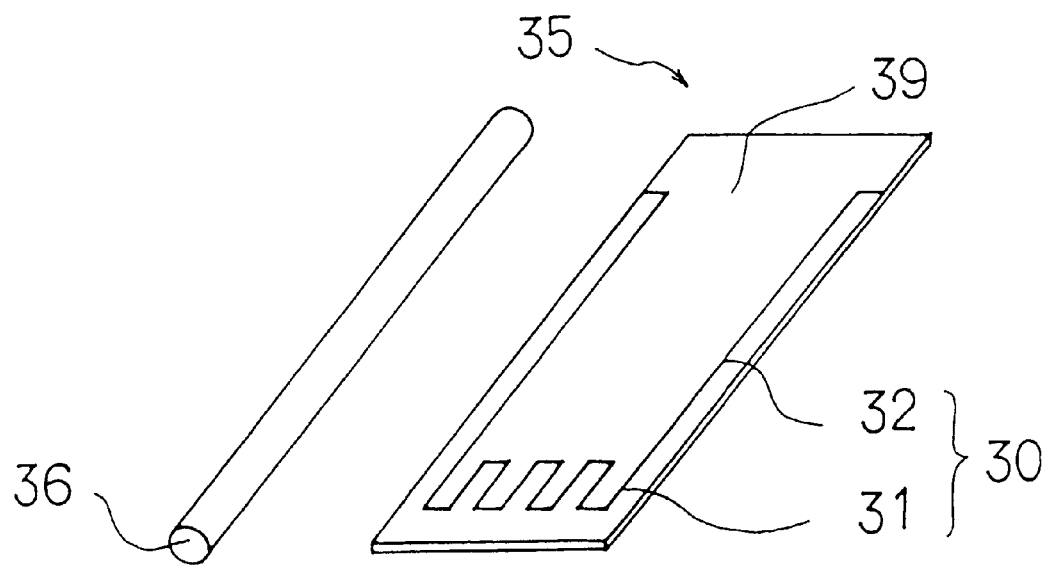
FIG. 3 is a view illustrating a method for manufacturing the ceramic heater employing the ceramic-metal junction structure in accordance with the first embodiment of the present invention.

The ceramic-metal junction structure 1 in accordance with the first embodiment is applicable to a round rod ceramic heater, having a circular cross section, shown in FIGS. 2 and 3. The ceramic heater is preferably used as a heater installable in an oxygen sensor.

The ceramic heater, as shown in FIG. 2, comprises a heat-generating portion 21 accommodating a heating element and a support portion 22 supporting the heat-generating portion 21. A lead portion 111 is accommodated in the support section 22 and electrically connected to the heating element.

As shown in FIGS. 1 and 2, in the ceramic-metal junction structure 1, the metallic layer 11 provided on the surface of the ceramic body 10 is electrically connected to the lead portion 111 via a through hole 112 provided in the ceramic body 10. An electric wire (Ni wire of (Φ=0.6 mm), serving as the conductive member 14, is electrically connected to the metallic layer 11 via the junction layer 12. The electric wire is connected to an external power source for supplying electric power to the heating element via the lead portion 111.

The ceramic heater, employing the ceramic-metal junction structure in accordance with the first embodiment of the present invention, is manufactured in the following manner.

First, a slurry is fabricated by mixing a powdered starting material into a solvent. Approximately 92 wt % of the starting material is $Al_2O_3$, and the reminder (i.e., 8 wt %) is $SiO_2$, CaO and MgO. The fabricated slurry is formed into a sheet with a thickness of 1.2 mm by using the doctor blade method. Then, the obtained sheet is punched by a press machine to obtain a green sheet 35 having predetermined shape and size as shown in FIG. 3. The green sheet 35 serves as a cover of the heater, and has two pin holes serving as the through holes 112.

Next, as shown in FIG. 3, a heater pattern 30, including a heating element 31 and a lead portion 32, is formed on the surface of the green sheet 35 by screen printing a conductive paste. During this screen printing operation, each pin hole is filled with the conductive paste.

Then, the metallic layer 11 is formed by printing the conductive paste on the reverse surface of the green sheet, so that the formed metallic layer 11 is electrically connected to the printed lead portion 32 via the through hole 112. Thus, the metallic layer 11 serves as an output terminal of the lead portion 32. According to this embodiment, the metallic layer 11 contains 100 wt % of W.

An organic binder, including ethyl cellulose dissolved by an organic solvent, is printed on the entire surface of the sheet 35. Then, the sheet 35 is wound along the outer cylindrical surface of a round ceramic rod 36 and bonded to the ceramic rod 36. Next, the assembled unit of the sheet 35 and the rod 35 is sintered in a furnace.

The electric wire (Ni), i.e., conductive member 14, is securely brazed to the metallic layer 11. The brazing is performed at a high temperature of 1,000~1,200° C. by using a Cu-containing wax material (100 wt % Cu). The wax material, when sintered, becomes the junction layer 12 providing a sufficient strength in the bonding between the conductive member 14 and the metallic layer 11. Thereafter, a secondary plating layer 15 is formed on the entire surfaces of the conductive member 14 and the junction layer 12, thereby obtaining the ceramic heater.

The first embodiment functions and brings effects in the following manner.

The ceramic-metal junction structure 1 of the first embodiment comprises the ceramic body 10, the metallic layer 11 chiefly containing W and provided on the surface of the ceramic body 10, the junction layer 12 containing both Cu and Ni and provided on the metallic layer 11, and the conductive member 14 bonded to the metallic layer 11 via the junction layer 12.

As the junction layer 12 includes Ni, the junction layer 12 has excellent wettability for the W-containing metallic layer 11. Thus, the junction layer 12 provides a sufficient strength in the bonding between the conductive member 14 and the metallic layer 11.

Furthermore, there is no necessity of providing the Ni-plating film which was required for the conventional ceramic-metal junction structure. The manufacturing cost can be reduced by omitting the Ni-plating film.

As described above, the first embodiment of the present invention provides the ceramic-metal junction structure capable of assuring a sufficient strength in the bonding between the metallic layer and the conductive member and also capable of reducing the manufacturing cost.

The performance of the ceramic-metal junction structure in accordance with the first embodiment will be evaluated by using the following samples 1~1-1-6 and 2-1~2-6 and tables 1 and 2.

Each sample has the arrangement similar to that shown in FIG. 1.

Namely, each sample has a ceramic-metal junction structure comprising a metallic layer provided on a ceramic body, and a conductive member connected bonded to the metallic layer via a junction layer.

In the tables 1 and 2, "composition of junction layer before bonding" represents the composition of the wax used in the bonding of the conductive member. Numerical data of "Ni concentration in the junction layer after bonding" is obtained by analyzing the junction layer according to the energy dispersive X-ray analysis method.

The conductive members used in the samples shown in the table 1 are identical with each other and made of stainless. The metallic layer contains 95 wt % W and a ceramic component, such as alumina.

The conductive members used in the samples 2-1~2-5 shown in the table 2 are identical each other and made of Ni. Only the conductive member used in the sample 2~6 is made of coval (composition: 54 wt % Fe; 30 wt % Ni, and 16 wt % Co).

Each sample was subjected to the tensile test, and the test result is shown at "tensile strength" in the tables 1 and 2.

According to the table 1, the samples 1-2~1-4 were cut off at their conductive members. In other words, during the tensile test applied to these samples 1-2~1-4, the junction layer remained properly without being cut off by the large tensile load (70N). Thus, the bonding between the metallic layer and the conductive member was maintained properly by the junction layer even after finishing the tensile test. However, the samples 1-1 and 1-5 were cut off at the boundary or somewhere between the metallic layer and the junction layer when the applied tensile load exceeded the indicated values, respectively.

As the sample 1-1 contains no Ni in the junction layer (i.e., in the wax material), the junction layer has poor wettability for the metallic layer. Thus, the junction layer of the sample 1-1 cannot provide a sufficient strength in the bonding between the conductive member and the metallic layer. On the other hand, the sample 1-5 contains a great amount of Ni in the junction layer. This is not desirable in that the excessive Ni reacts with W contained in the metallic layer to produce the generation of the W—Ni intermetallic compound. Thus, the junction layer of the sample 1-5 cannot provide a sufficient strength in the bonding between the conductive member and the metallic layer.

According to the table 2, the samples 2-1~2-4 and 2-6 were cut off at their conductive members. In other words, during the tensile test applied to these samples 2-1~2-4 and 2-6, the junction layer remained properly without being cut off by the large tensile load. Thus, the bonding between the metallic layer and the conductive member was maintained properly by the junction layer even after finishing the tensile test. However, the samples 2-5 was cut off at the boundary or somewhere between the metallic layer and the junction layer when the applied tensile load exceeded the indicated value.

As the sample 2-5 contains a small amount of Ni in the junction layer (i.e., in the wax material), the junction layer has poor wettability for the metallic layer. Thus, the junction layer of the sample 2-5 cannot provide a sufficient strength in the bonding between the conductive member and the metallic layer.

TABLE 1

| sample | 1-1 | 1-2 | 1-3 | 1-4 | 1-5 |
|---|---|---|---|---|---|
| composition of junction layer before bonding Cu (wt %) | 100 | 98 | 90 | 80 | 60 |
| composition of junction layer before bonding Ni (wt %) | 0 | 2 | 10 | 20 | 40 |
| conductive member | stainless | stainless | stainless | stainless | stainless |
| Ni concentration (wt %) in the junction layer after bonding | 0 | 2 | 10 | 20 | 40 |
| tensile strength (N) | 45 | 70< *1 | 70< *1 | 70< *1 | 30 |

*1 the conductive member is cut off when the applied forces exceeds 70N.

TABLE 2

| sample | 2-1 | 2-2 | 2-3 | 2-4 | 2-5 | 2-6 |
|---|---|---|---|---|---|---|
| composition of junction layer before bonding Cu (wt %) | 100 | 80 | 60 | 40 | 20 | 100 |
| composition of junction layer before bonding Au (wt %) | 0 | 20 | 40 | 60 | 80 | 0 |
| conductive member | Ni | Ni | Ni | Ni | Ni | coval |
| Ni concentration (wt %) in the junction layer after bonding | 8 | 7 | 5 | 3 | <1 | 4 |
| tensile strength (N) | 70< *1 | 70< *1 | 70< *1 | 70< *1 | 47 | 70< *1 |

*1 the conductive member is cut off when the applied force exceeds 70N.

Second Embodiment

Figure 4:
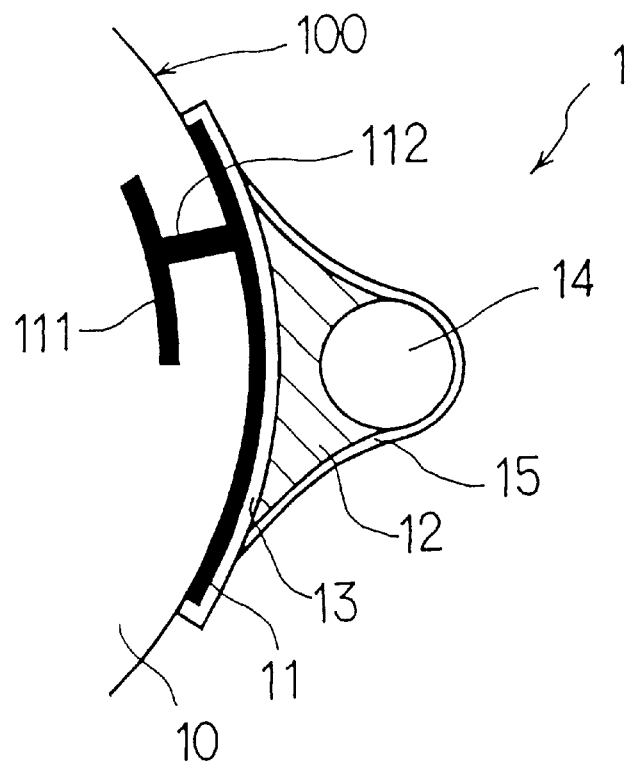
FIG. 4 is a cross-sectional view showing an essential arrangement of a ceramic-metal junction structure comprising a Ni-plating film in accordance with a second embodiment of the present invention.

FIG. 4 shows a ceramic-metal junction structure in accordance with a second embodiment of the present invention.

As shown in FIG. 4, a ceramic-metal junction structure 1 in accordance with the second embodiment comprises a ceramic body 10, and a metallic layer 11 provided on a surface 100 of the ceramic body 10. The metallic layer 11 contains 70~100 wt % W. A Ni-plating film 13 is provided on the metallic layer 11. The Ni-plating film 13 is 1 μm in thickness.

A junction layer 12 is provided on the Ni-plating film 13. The junction layer 12 contains Cu as a main component. And, a conductive member 14 is bonded to the metallic layer 11 via the junction layer 12.

The junction layer 12 contains 92 wt % Cu and 8 wt % Ni. The conductive member 14 contains 100 wt % Ni.

The rest is substantially the same as that of the first embodiment.

The performance of the ceramic-metal junction structure in accordance with the second embodiment will be evaluated by using the following samples 3-1~3-5 and a table 3.

Prepared samples 3-1~3-5 of the second embodiment have the same arrangement similar to that shown in FIG. 4. In the ceramic-metal junction structure applied to the samples 3-1~3-5, compositions of the metallic layers, the junction layers and the conductive members are not differentiated among the samples 3-1~3-5. However, the thickness of the Ni-plating film is differentiated from each other among the samples 3-1~3-5.

Each of the samples 3-1~3-5 was subjected to the tensile test in the same manner as described in the first embodiment, and the test result is shown at "tensile strength" in the table 3.

According to the table 3, during the tensile test applied to the samples 3-1~3-3, the junction layer remained properly without being cut off by the large tensile load even when the conductive member was cut off. However, the samples 3-4 and 4-5 were cut off at the boundary or somewhere between the metallic layer and the junction layer when the applied tensile load exceeded the indicated values, respectively.

This is believed that the generation of the W—Ni intermetallic compound is produced when the Ni-plating film is excessively thick. Thus, the junction layers of the sample 3-4 and 3-5 cannot provide a sufficient strength in the bonding between the conductive member and the metallic layer.

TABLE 3

| sample | 3-1 | 3-2 | 3-3 | 3-4 | 3-5 |
|---|---|---|---|---|---|
| thickness of Ni-plating film ($\mu$m) | 0.0 | 0.5 | 1.0 | 2.0 | 4.0 |
| tensile strength (N) | 70<*1 | 70<*1 | 70<*1 | 55 | 40 |

*1 - the conductive member is cut off when the applied force exceeds 70N.

Third Embodiment

A ceramic-metal junction structure in accordance with a third embodiment of the present invention functions as a multilayered ceramic heater, although the arrangement of the third embodiment is substantially similar to that of the first embodiment.

Figure 5:
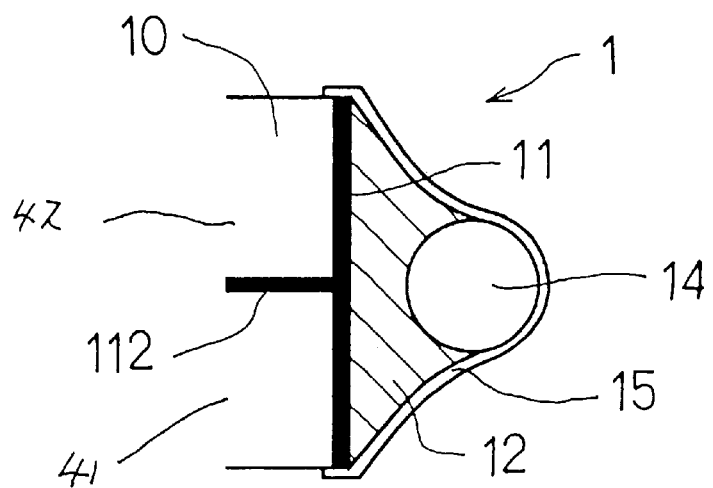
FIG. 5 is a cross-sectional view showing an essential arrangement of a ceramic-metal junction structure in accordance with a third embodiment of the present invention, taken along a line B—B shown in FIG. 6D.

As shown in FIG. 5, a ceramic-metal junction structure 1 in accordance with the third embodiment comprises a ceramic body 10, and a metallic layer 11 provided on a surface 100 of the ceramic body 10. The metallic layer 11 contains 70~100 wt % W. A junction layer 12 is provided on the metallic layer 11. The junction layer 12 contains Cu as a main component. And, a conductive member 14 is bonded to the metallic layer 11 via the junction layer 12. The junction layer 12 contains 92 wt % Cu and 8 wt % Ni. The conductive member 14 is made of Ni.

Figure 6A:
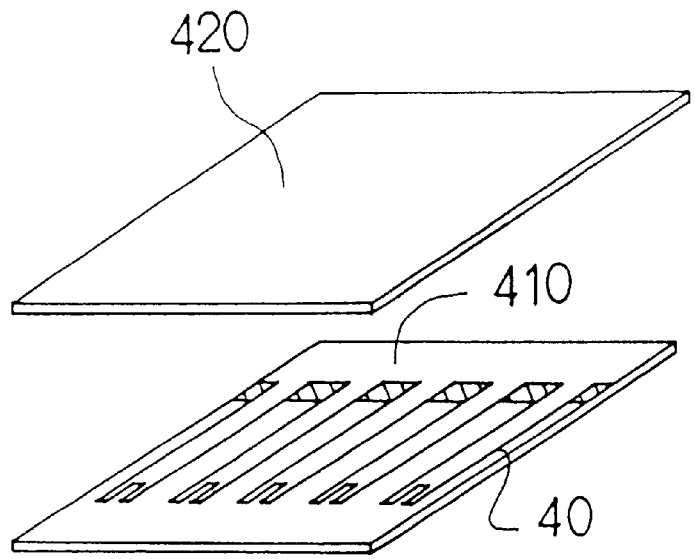
FIGS. 6A to 6D are views illustrating a method for manufacturing a multilayered ceramic heater employing the ceramic-metal junction structure in accordance with the third embodiment of the present invention.
Figure 6B:
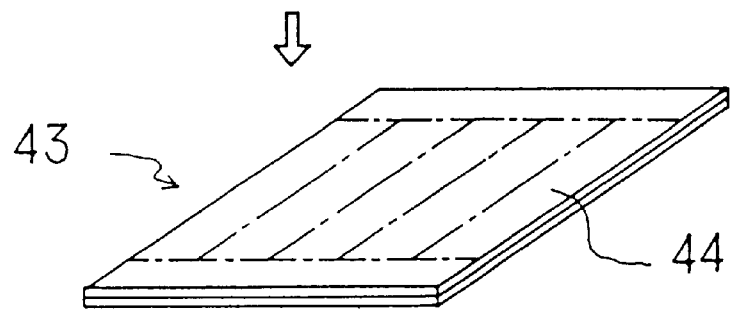
Figure 6C:
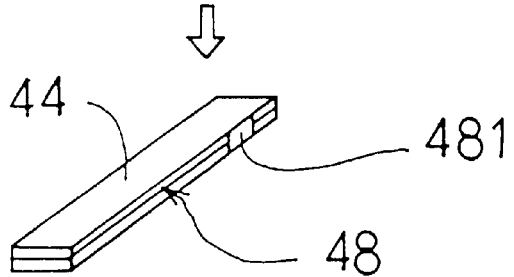
Figure 6D:
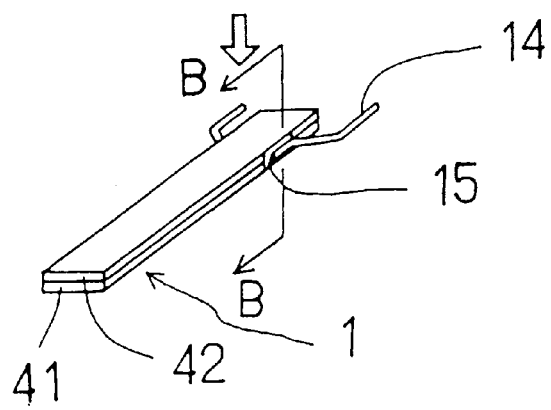

As shown in FIG. 6D, the multilayered ceramic heater employing the ceramic-metal junction structure 1 of the third embodiment comprises a heater substrate 41 including a heating element (not shown) and a lead-portion 112, and a cover substrate 42 accumulated on the heater substrate 41. The heating element and the lead portion 112 are concealed between the heater substrate 41 and the cover substrate 42. The metallic layer 1 serves as a side-face electrode electrically connected to the lead portion 112. The conductive member 14, to be bonded to the metallic layer 11, is an electric wire supplying electric power to the heating element via the lead portion 112.

Furthermore, a secondary plating film 15 is formed on the entire surfaces of the conductive member 14 and the junction layer 12, thereby providing a protecting cover.

The rest of the third embodiment is similar to that of the first embodiment.

The multilayered ceramic heater, employing the ceramic-metal junction structure in accordance with the third embodiment of the present invention, is manufactured in the following manner.

First, a slurry is fabricated by mixing a powdered starting material into a solvent. Approximately 92 wt % of the starting material is $Al_2O_3$, and the reminder (i.e., 8 wt %) is $SiO_2$, CaO and MgO. The fabricated slurry is formed into a sheet with a thickness of 1.2 mm by using the doctor blade method. Then, the obtained sheet is punched by a press machine to obtain square green sheets 410 and 420 each having the size of 120 mm×120 mm. The green sheet 410 serves as the heater substrate 41. The green sheet 420 serves as the cover substrate 42.

Regarding the fabrication of the green sheets 410 and 420, it is possible to adopt other methods including the extrusion molding.

Next, as shown in FIG. 6A, a plurality of heater patterns 40 are printed on the green sheet 410 by using a conductive paste including metal, such as W and Mo, as a main component.

Then, the green sheet 420 is accumulated on the heater patterned surface of the green sheet 410 of the cover substrate to obtain a multilayered heater body 43. The number of layers, i.e., the total number of green sheets 410 and 420, constituting the heater body 43 depends on the purpose of use and therefore can be flexibly changed.

Furthermore, when the heater substrate consists of a plurality of green sheets 410, the connecting pattern of the heater patterns 40 is freely selectable between series and parallel.

Then, as shown in FIG. 6B, the multilayered heater body 43 is cut off along an alternate long and short dash line to obtain a plurality of intermediate products 44 each accommodating a single heater pattern 40 (refer to FIG. 6C).

Then, a printing portion 481 is formed on a side surface 48 of each intermediate product 44 by using a conductive paste containing W and Mo. The printing portion 481 is electrically connected to the heater pattern 40 in the intermediate product 44. The printing portion 481, when sintered, becomes the metallic layer 11.

Furthermore, the conductive paste for the printing portion 481 may be different from or identical with the conductive paste for the heater pattern 40.

Thereafter, the intermediate product 44 is sintered at a temperature of 1,400° C. to 1,600° C. in a reducing atmosphere consisting of $N_2$ and $H_2$ gases, thereby obtaining the sintered intermediate product 44. It is possible to add a step for polishing an edge of the sintered intermediate product 44 into a desired shape by using a polishing machine.

The conductive member 14, made of Ni, is securely brazed to the metallic layer 11 of the sintered intermediate product 44 by using a Cu-wax material (composition: 100 wt % Cu) at a brazing temperature of 1,000~1,200° C. Through this brazing, the junction layer 12 is formed.

Finally, a secondary plating film 15 is formed on the entire surfaces of the junction layer 12 and the conductive member 14, thereby providing the multilayered ceramic heater of the third embodiment of the present invention.

The rest of the third embodiment is similar to that of the first embodiment.

The ceramic-metal junction structure of the third embodiment brings the same functions and effects as those of the first embodiment.

Fourth Embodiment

The manufacturing method disclosed in the first embodiment can be modified in the following manner.

A green sheet is obtained so as to have the metallic layer 11 fabricated by the method disclosed in the first embodiment.

Then, the Ni plating is performed on the metallic layer 11 to form the Ni-plating film 13 having a thickness of approximately 4 $\mu$m. An electric wire (Ni content=90 wt % or more), i.e., the conductive member 14, is securely brazed on the Ni-plating film 13 by the brazing. The brazing operation is performed at a high temperature of 950~1,100° C. by using a Cu-containing wax material. Thereafter, the secondary plating layer 15 is formed on the entire surfaces of the conductive member 14 and the junction layer 12, thereby obtaining the ceramic heater.

According to the resultant ceramic heater, the Ni-plating film 13 was substantially eliminated due to the high temperature during the brazing operation. The thickness of the Ni-plating film 13 was reduced to several $\mu$m. It is believed that the Ni-plating film 13 melted or the wax material diffused into the Ni-plating film 13.

However, a heat affected Ni-plating layer is found between the metallic layer 11 and the conductive member 14. This heat affected layer comprises the Ni-plating layer chemically combined with the components in the metallic layer 11 and the conductive member 14.

According to this embodiment, the Ni-plating film 13 is formed on the metallic layer 11. This is effective to improve the wettability for the brazing, easily realizing an excellent junction structure.

The thickness of the Ni-plating film 13 is not limited to 4 $\mu$m. A preferable thickness of the Ni-plating film 13 is in the range from 0~10 $\mu$m (more preferably 0~5 $\mu$m).

When the Ni-plating film 13 is thin (e.g., 1 $\mu$m), the Ni-plating film 13 is completely eliminated. The Ni-plating film 13 melts or chemically changes into a compound with other layers, when subjected to the high-temperature during the brazing operation. Thus, only the heat affected Ni-plating layer exists between the metallic layer and the conductive layer.

By providing the Ni-plating film in this manner, the wettability for the brazing can be improved and an excellent junction structure can be easily realized.

If the thickness of the Ni-plating film 13 exceeds 10 $\mu$m, the bonding strength will deteriorate due to the thick Ni-plating film 13.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A ceramic-metal junction structure comprising:

a ceramic body;

a metallic layer provided on a surface of said ceramic body including 70~100 wt % tungsten;

a Ni-plating film provided on said metallic layer, said Ni-plating film having a thickness equal to or less than 1 $\mu$m;

a junction layer provided on said Ni-plating film including 65~98 wt % copper and 2~20 wt % nickel; and a conductive member bonded to said metallic layer via said Ni-plating film and said junction layer.

2. The ceramic-metal junction structure in accordance with claim 1, wherein said junction layer contains 0~33 wt % gold.

3. The ceramic-metal junction structure in accordance with claim 1, wherein an affected nickel layer is formed between said metallic layer and said junction layer, and the nickel content in said affected nickel layer is larger than that in said junction layer.

4. The ceramic-metal junction structure in accordance with claim 1, wherein said conductive member contains 90~100 wt % nickel.

5. The ceramic-metal junction structure in accordance with claim 1, wherein said junction layer contains at least one substance selected from the group consisting of P, Cd, Pd, Zn, and Fe, and the total amount of said selected substance or substances is equal to or smaller than 10 wt %.

6. The ceramic-metal junction structure in accordance with claim 1, wherein said ceramic-metal junction structure is employed in a ceramic heater.

7. A method for manufacturing a ceramic-metal junction structure comprising:

forming a metallic layer on a surface of a ceramic body, said metallic layer including 70~100 wt % tungsten;

forming a Ni-plating film on said metallic layer, said Ni-plating film having a thickness equal to or less than 1 $\mu$m; and bonding a conductive member on a surface of said Ni-plating film by using a junction layer including 65–98 wt % copper and 2–20 wt % nickel.

8. The method for manufacturing a ceramic-metal junction structure in accordance with claim 7, wherein said junction layer contains 65~98 wt % copper.

9. The method for manufacturing a ceramic-metal junction structure in accordance with claim 7, wherein said conductive member contains nickel.

10. The method for manufacturing a ceramic-metal junction structure in accordance with claim 9, wherein the nickel content in said conductive member is not smaller than 90 wt %.

11. The method for manufacturing a ceramic-metal junction structure in accordance with claim 7, wherein the thickness of said Ni-plating film is not larger than 5 $\mu$m before said conductive member is bonded on said Ni-plating film by brazing.

* * * * *

UNITED STATES PATENT AND TRADEMARK OFFICE
CERTIFICATE OF CORRECTION

PATENT NO. :6,121,590
DATED :September 19, 2000
INVENTOR(s) :KOBAYASHI et al.

It is certified that error appears in the above-identified patent and that said Letters Patent is hereby corrected as shown below:

Title Page,

Please add:

-- [63] Division of application No. 09/233,098, Jan. 19, 1999. --

Signed and Sealed this

Fifteenth Day of May, 2001

*Attest:*

NICHOLAS P. GODICI

*Attesting Officer*  *Acting Director of the United States Patent and Trademark Office*